US009316719B1

(12) United States Patent
Sternowski

(10) Patent No.: US 9,316,719 B1
(45) **Date of Patent: *Apr. 19, 2016**

(54) POWER DIFFERENCE OF ARRIVAL GEOLOCATION

(75) Inventor: Robert Sternowski, Cedar Rapids, IA (US)

(73) Assignee: Softronics, Ltd., Marion, IA (US)

( * ) Notice: Subject to any disclaimer, the term of this patent is extended or adjusted under 35 U.S.C. 154(b) by 670 days.

This patent is subject to a terminal disclaimer.

(21) Appl. No.: 13/493,449

(22) Filed: Jun. 11, 2012

Related U.S. Application Data

(60) Provisional application No. 61/610,561, filed on Mar. 14, 2012.

(51) Int. Cl.
*G01S 3/02* (2006.01)
*G01S 5/02* (2010.01)

(52) U.S. Cl.
CPC *G01S 5/0252* (2013.01); *G01S 5/02* (2013.01)

(58) Field of Classification Search
CPC ................................ G01S 5/0252; G01S 5/02
USPC .......................................................... 342/450
See application file for complete search history.

(56) References Cited

U.S. PATENT DOCUMENTS 5,614,912 A * 3/1997 Mitchell ............... G01S 13/003 342/146
7,345,582 B2 3/2008 Gould
7,550,738 B1 6/2009 DeVito
7,817,092 B1 10/2010 Olivieri et al.
8,004,459 B2 8/2011 Ho et al.
8,525,725 B2 * 9/2013 Libby et al. ..................... 342/59
8,862,067 B2 * 10/2014 Un et al. .................... 455/67.11
2005/0032531 A1 * 2/2005 Gong et al. ................ 455/456.5
2005/0080557 A1 * 4/2005 Sirola ....................... G01S 5/12 455/456.1
2009/0005061 A1 1/2009 Ward et al.
2009/0201208 A1 * 8/2009 McPherson et al. .. G01S 13/878 342/458
2010/0194641 A1 8/2010 Miller
2014/0134948 A1 * 5/2014 Ghose .................. H04W 4/008 455/41.2

OTHER PUBLICATIONS

Wang et al., "A Near-Optimal Least Squares Solution to Received Signal Strength Difference Based Geolocation", Crown, 2001.*
Jackson et al., "Received Signal Strength Difference Emitter Geolocation Least Squares Algorithm Comparison", CCECE May 2011, Niagara Falls, Canada.*

(Continued)

*Primary Examiner* — Frank J McGue
(74) *Attorney, Agent, or Firm* — Jason R. Sytsma; Shuttleworth & Ingersoll, PLC

(57) ABSTRACT

A system suitable for determining a location of an emitter emitting a signal of interest from an unknown location has a vehicle with a location position determining apparatus to receive a location datum, so the location of the vehicle can be determined when the signal of interest is received. An antenna connected to a receiver is positioned on the vehicle to detect and receive the signal of interest at a plurality of locations. A processor having a program executing therein determines the power level of the signal of interest at each measurement location and determines the location of the emitter from the change in power level of the signal of interest between measurement locations.

43 Claims, 12 Drawing Sheets

4 measurement points produce 6 signal pair combinations, 1 UNAMBIGUOUS solution

(56) References Cited

OTHER PUBLICATIONS

Lin et al., “Mobile Location Estimation Based on Differences of Signal Attenuations for GSM Systems”, IEEE Transactions on Vehicular Technology, vol. 54, No. 4, Jul. 2005.*

B.R. Jackson, S. Wang and R. Inkol, Emitter Geolocation Estimation Using Power Difference of Arrival—An Algorithm Comparison for Non-Cooperative Emitters, Defence Research and Development Canada, Technical Report, May 2011.

* cited by examiner 0 db (0%) measurement error injected 0.5 db (10%) measurement error injected 1 db (20%) measurement error injected 2 db (40%) measurement error injected

POWER DIFFERENCE OF ARRIVAL GEOLOCATION

This application claims priority to U.S. Provisional Application No. 61/610,561 filed Mar. 14, 2012, the entirety of which is incorporated by reference herein.

BACKGROUND

Modern military operations depend on the timely acquisition of intelligence information by electro-optic, infrared, and radio frequency (RF) sensors. Specialized RF sensors have long been used to geolocate radio frequency transmitters used by opposing forces. However, these systems require a substantial investment in expensive equipment and highly trained personnel. Consequently, concepts for exploiting technical advances to network relatively low cost autonomous RF sensors for geolocating radio frequency transmitters are of practical interest.

Approaches based on the use of power measurements are of particular interest due to the simplicity of the sensors, especially the antenna. The basic concept of the power difference of arrival (PDOA) geolocation technique is that, using a suitable path loss model, a geolocation estimate can be obtained from power-level measurements for any type of electro-magnetic wave or an energy emitter from one mobile sensor or an array of sensors.

Finding a suitable path loss model has complicated use of the PDOA geolocation technique. Any number of environmental factors, including concrete structures, windows, and trees, vary the propagation exponent and thereby inject measurement errors into the location calculation, making an accurate location of the transmitter difficult to discern. Finding suitable path loss model that allows for the assumption of a substantially constant path loss exponent for the RF signal as it travels through a medium would make the PDOA geolocation technique very useful.

SUMMARY

According to the present invention, a system for determining a location of an emitter emitting a signal of interest is provided. The system includes a vehicle capable of being positioned at a location where there is a generally constant path loss exponent as the signal of interest travels through a medium from the emitter to the vehicle. The vehicle has a position determining device to report a location datum, so the location of the vehicle can be determined when the signal of interest is received. An antenna connected to a receiver is positioned on the vehicle to detect and receive the signal of interest at a plurality of locations. A processor having a program executing therein determines the power level of the signal of interest at each measurement location and determines the location of the emitter from the change in power level of the signal of interest between measurement locations.

Assuming there is a substantially constant path loss exponent for the signal of interest as it propagates through a medium from the emitter to the antenna, the only factor accounting for a change in signal strength of the signal of interest is the distance between the antenna and the emitter. From this assumption, the system determines the location of the emitter by equating a ratio of the distances between the measurement points and the emitter with a ratio of a change in power level of the signal of interest between measurement points.

In another embodiment, a method for determining the location of the emitter is provided. The signal of interest is received at a plurality of measurement points, and the coordinates for each measurement point are determined. The power level of the signal of interest at each measurement point is also determined. Assuming a substantially constant path loss exponent for the signal of interest as it travels through a medium, the method calculates the location of the emitter by equating a ratio of the distances between the measurement points and the emitter with a ratio of a change in power level of the signal of interest between measurement points.

DETAILED DESCRIPTION OF THE ILLUSTRATED EMBODIMENTS

In general, a geolocation system according to an embodiment of the invention makes use of a sensor taking measurements in multiple locations with each location allowing for an assumption of a generally constant free-space propagation loss exponent between the sensor and the emitter. This constant propagation loss property in free-space means that only a changing distance between the sensor and the emitter can account for a change in received power. From this assumption, the location of the emitter can be determined.

The minimum number of power measurements for determining an unambiguous location of the emitter is four; however, the location can be accurately predicted with as few as three power measurements. Two power measurements can yield a useful result showing the location for the emitter somewhere on a unique set of locus of points according to the power ratio between two measurement points. For the purpose of this disclosure an emitter can be any device emitting an electro-magnetic wave, including an electro-magnetic wave in the form of an RF signal or light, as well as any other type of energy source, including audio.

Figure 1:
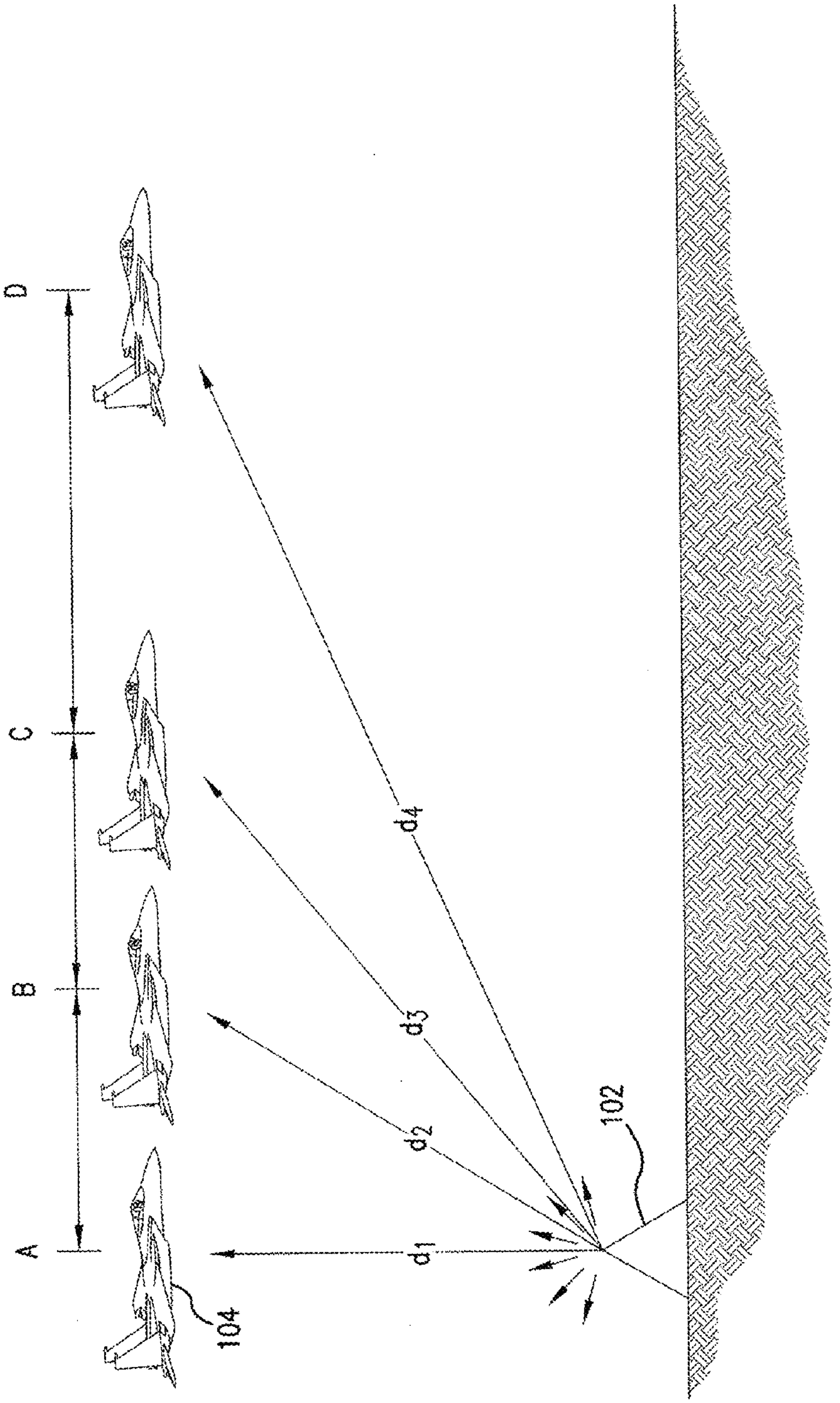
FIG. 1 illustrates the geolocation scenario where an emitter at an unknown location emits signals that are received at four distinct locations by a receiver positioned on a vehicle.

FIG. 1 shows an emitter 102 emitting an electromagnetic signal at a generally constant power level from an unknown location (x,y). Emitter 102 is assumed to be stationery or moving slowly with respect to vehicle 104. Vehicle 104 can be any apparatus capable of being positioned at a location where there is a generally constant path loss exponent for the signal of interest as it travels through a medium from the emitter to vehicle 104, such as a land based vehicle operating in an appropriate environment where there is a line of sight between the location for the unknown emitter and the sensor, an air or space based vehicle, including, for example, an airplane, a helicopter, a satellite, an unmanned vehicle, or a balloon, or a sea-based vehicle, including, for example, a ship or a submarine, or a stationary vehicle such as a tower.

Figure 1A:
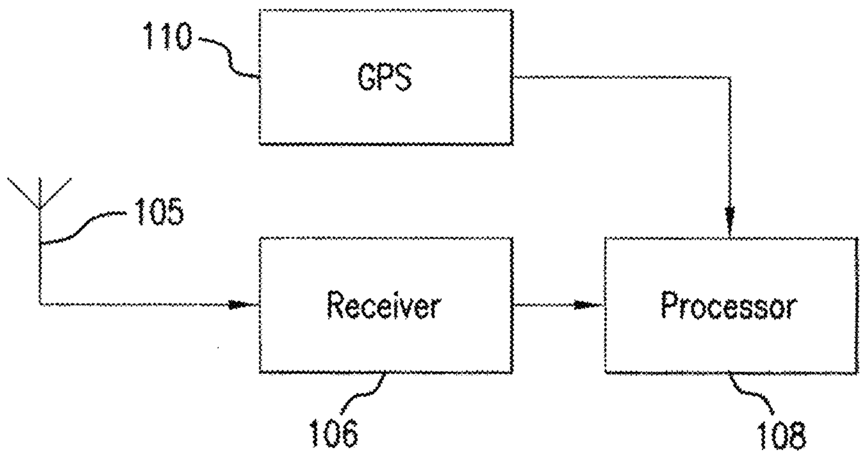
FIG. 1A is a schematic of a receiver system located in the vehicle of FIG. 1.

Vehicle 104 has an omnidirectional frequency-independent antenna 105 electrically connected to a receiver 106, as shown in FIG. 1A. Receiver 106 periodically detects the signal of interest at multiple locations, and logs the location of each measurement. A processor 108 in communication with receiver 106 determines a power measurement for the signal of interest at each location and the change in power level of the signal between locations.

A position determining device 110 is connected to processor 108 to provide processor 108 with the location of vehicle 104 when the signal of interest is received. Position determining device 110 can include an internal navigation device, a GPS receiver, or any other type of device capable of determining the geolocation of vehicle 104 at a given time. Alternatively, multiple stationary vehicles 104 can be positioned with each vehicle's 104 coordinates logged and stored in a centralized processor 108.

Processor 108 calculates the location of emitter 102 by equating a ratio of the distances between the measurement points and the emitter with a ratio of a change in power level of the signal of interest between measurement points. This can be performed on a continuous basis, improving the accuracy by accumulating more measurements from more locations. Because only the free-space loss can be responsible for the difference in signal power measurements between two points, the ratios must be equal. The path loss exponent of the signal of interest propagating in free space is proportional to 1/d2, where d is the distance from emitter 102 to antenna 105. The distance between the measurement points A,D is known from position determining device 110 that tracks the movement of vehicle 104.

Between any two measurement points, a set of possible solutions (a locus) for the location of emitter 102 can be determined from the following property: The ratio of the distances between any two measurement points (for example, A,D), and the unknown emitter 102 location must equal the ratio of the power between measurement points A,D. The solution can be defined as a circle that passes between the two measurements points and encircles the stronger of the two measurement points. The circle has a radius inversely proportional to the difference in signal strength, i.e. the diameter of the circle is related to the power ratio. The location for the emitter must lie somewhere on the circumference of the circle.

The distance ($d_{AB}$) between two measurement points A ($x_A$, $y_B$), B ($x_B$, $y_B$) is found by the following:

$$d_{AB}=\sqrt{(x_A-x_B)^2+(y_A-y_B)^2}$$

The ratio of the change in power level (K), where K is measured in decibels, of the signal of interest between the two measurement points A, B is defined by the following equation, where a equals the path loss exponent (α), which equals 2 in constant free-space, and $P_A-P_B$ is the difference in power level between the two measurement points A, B:

$$10^{\frac{P_A-P_B}{10\alpha}}=K$$

As stated above, the solution can be defined as a circle that passes between measurements points A ($x_A$, $y_B$), B ($x_B$, $y_B$) and encircles the stronger of the two measurement points, with a radius inversely proportional to the difference in signal strength. The center of the circle is translated and normalized into the x,y coordinate system by recognizing that the center of the circle lies on the straight line between measurement points A ($x_A$, $y_B$), B ($x_B$, $y_B$) that is offset from the x-axis by an angle, θ. The diameter of the circle and θ are defined as follows:

$$\text{Diameter}=\left(\frac{d_{AB}}{(K-1)}-\frac{d_{AB}}{K+1}\right)$$

$$\Theta=ATAN\left(\frac{y_A-y_B}{x_A-x_B}\right)$$

The center of the circle is offset from the stronger of the two measurement points by some value that is a function of the difference in power between the two measurement points and the distance between the two measurement points. Using the above equations, a solution set for the locus for the unknown emitter is defined as follows:

$$\begin{bmatrix} y_{center}=y_A+\text{Diameter}*\sin\Theta; & \text{if}(y_A>y_B) \\ y_{center}=y_A-\text{Diameter}*\sin\Theta; & \text{if}(y_B>y_A) \\ x_{center}=x_A+\text{Diameter}*\sin\Theta; & \text{if}(x_A>x_B) \\ x_{center}=x_A-\text{Diameter}*\sin\Theta; & \text{if}(x_B>x_A) \end{bmatrix}$$

The geolocation of emitter 102 lies somewhere on the locus of points defined by the circle. As previously stated, the solution set can be narrowed with more measurements, with each new measurement point producing new set of circle equations. It stands to reason that if the location of emitter 102 lies somewhere on the locus of points defined by each circle, then, between multiple circles, emitter 102 must lie on one of the intersection points of the circles. The intersection points for all of the measurement-pair loci can be solved as a set of simultaneous equations, which solutions are represented graphically in FIGS. 2-6.

Figure 2:
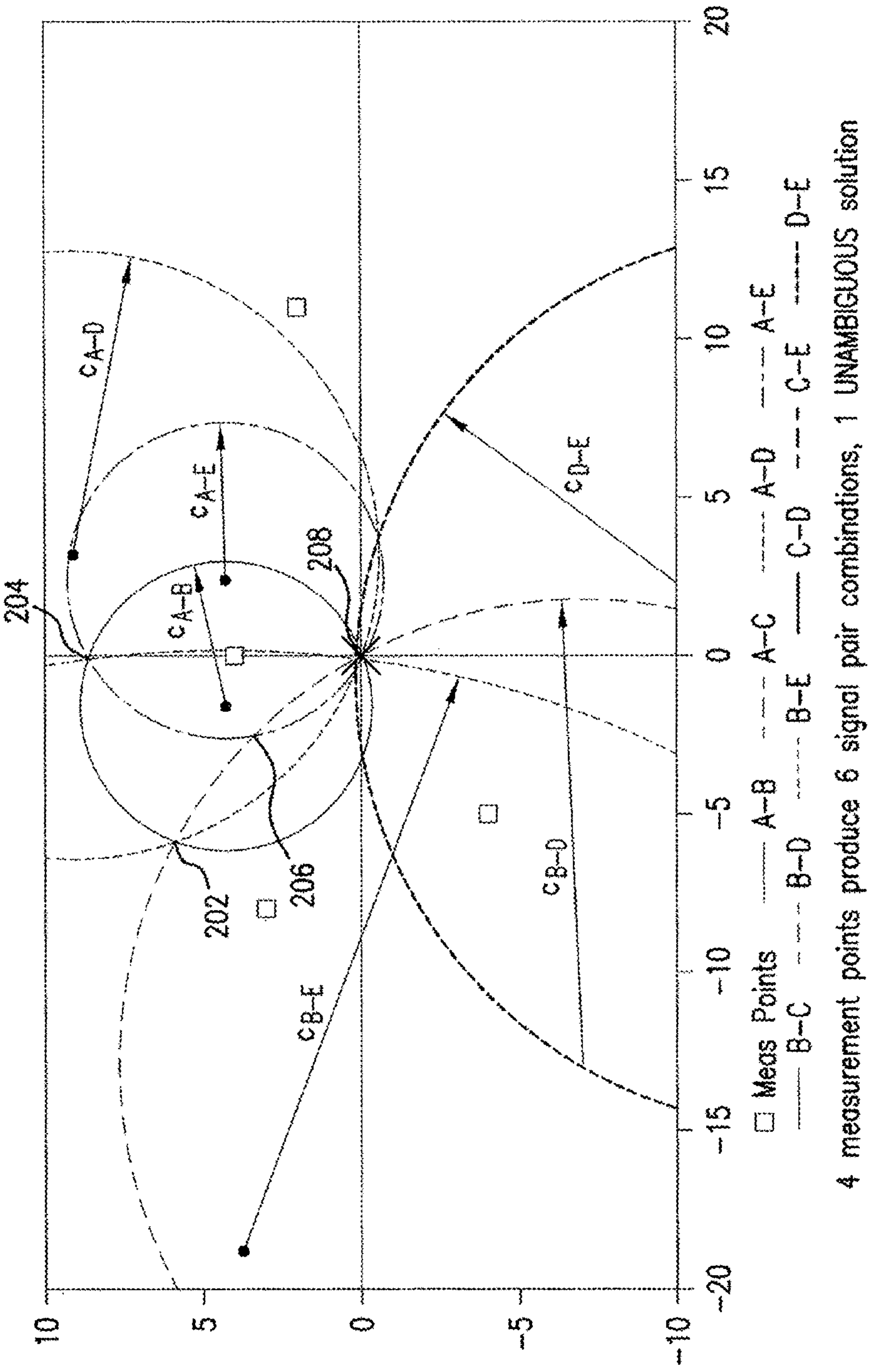
FIG. 2 is a graphical solution of the location of the emitter determined from four measurement points.

FIG. 2 shows a graphical solution for the location of emitter 102. Each of the six circles (A-B, A-D, A-E, B-D, B-E, and D-E) can intersect with another circle a maximum of two times. Consequently, there are up to eight intersections derived from four measurements. While many intersections of loci can be observed, for example, at points 202, 204, and 206, there is only one point 208 where all the loci intersect. The intersection of these six circles can be found in any conventional manner, for example, graphically by plotting the solutions, or mathematically by solving a set of simultaneous equations.

Figure 3:
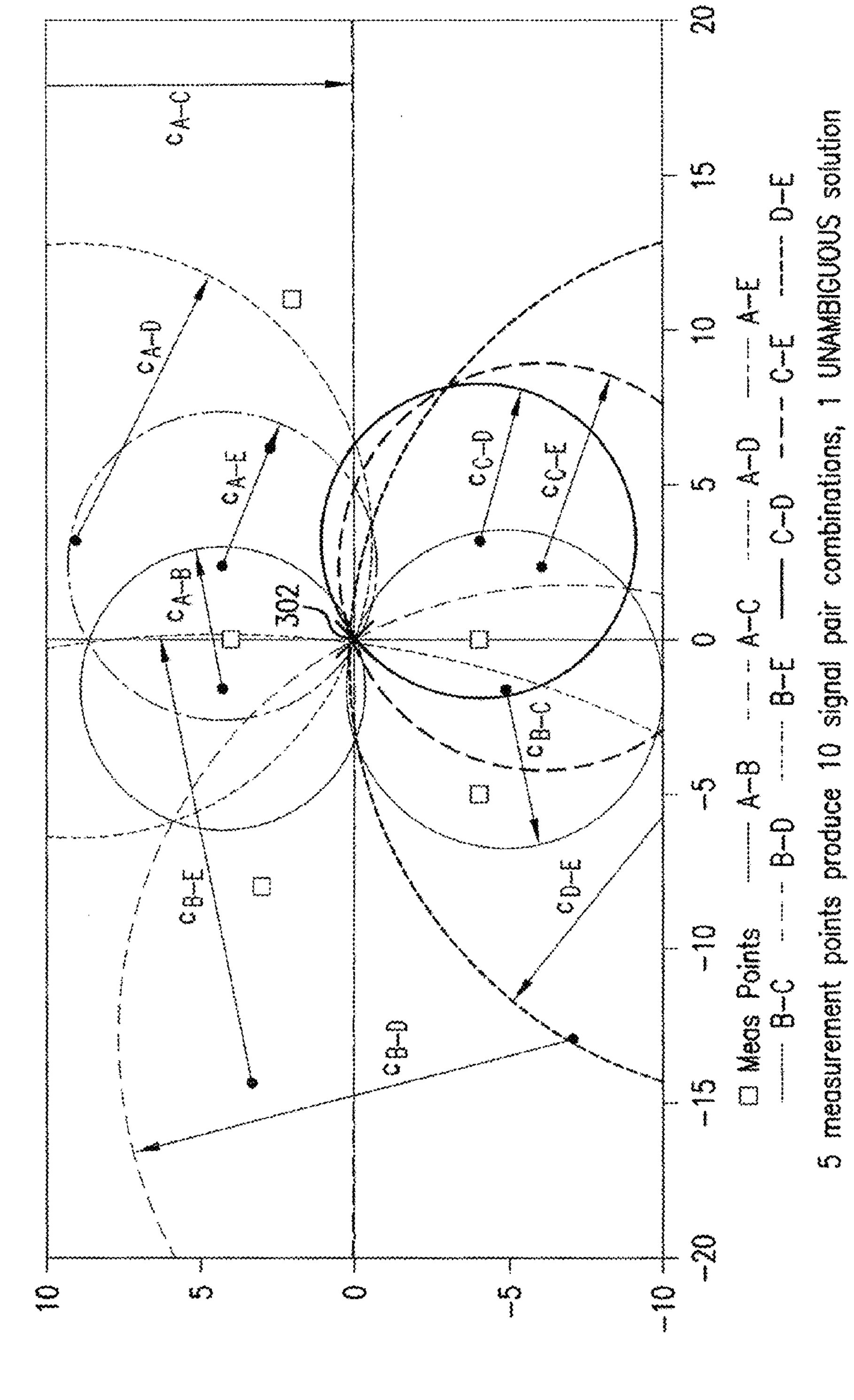
FIG. 3 is a graphical solution of the location of the emitter determined from five measurement points.

FIG. 3 shows a graphical solution where signal power measurements are taken at five distinct locations, A, B, C, D, E. The graphical solution produces ten signal pair combinations, and thus ten circles (A-B, A-C, A,D, A-E, B-C, B-D, B-E, C-D, C-E, and D-E), with a single unambiguous solution at point 302 for the position of emitter 102. Increasing the number of measurement points continues to yield a single unambiguous solution for the location of emitter 102, but with improved accuracy.

In situations with only three measurement points, the unknown location of emitter 102 can be accurately predicted in many situations from the number of intersections. Each intersection is a possible solution and often multiple intersections will lie on or near the same location. By grouping all the like intersections together and summing the number of like intersection, the largest grouping of intersections is the likely location for emitter 102.

Figure 4:
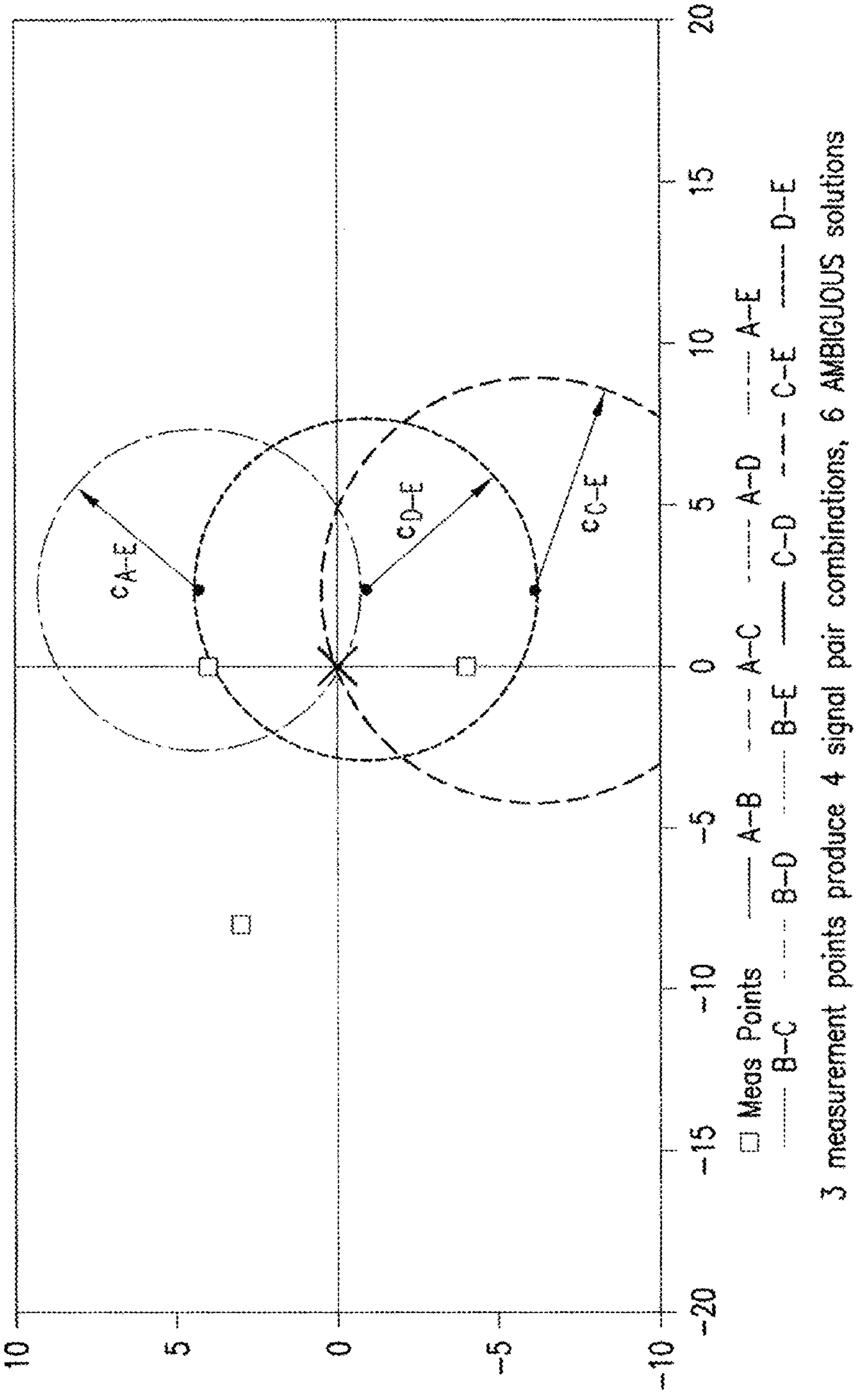
FIG. 4 is a graph illustrating several possible locations for the emitter provided by measurements from three points taken on a straight line path.

In some situations, the location of emitter 102 can not be estimated from three measurement points. For example, FIG. 4 shows a graph of signal power measurements taken at three distinct locations. The graphical solution produces four signal pair combinations with three circles and six ambiguous solutions. The centers for each of the three circles lie on a straight line. Therefore, the emitter is equally likely to be located at any of the six solutions. This situation is indicative of a sensor moving toward or away from emitter 102 in a straight line. Because, the sensor is on a moving vehicle 104, it is exceedingly unlikely to move in a perfectly straight line, which makes this solution an aberration. The more vehicle 104 deviates from a straight path, the more accurately the location of emitter 102 can be determined.

Figure 5:
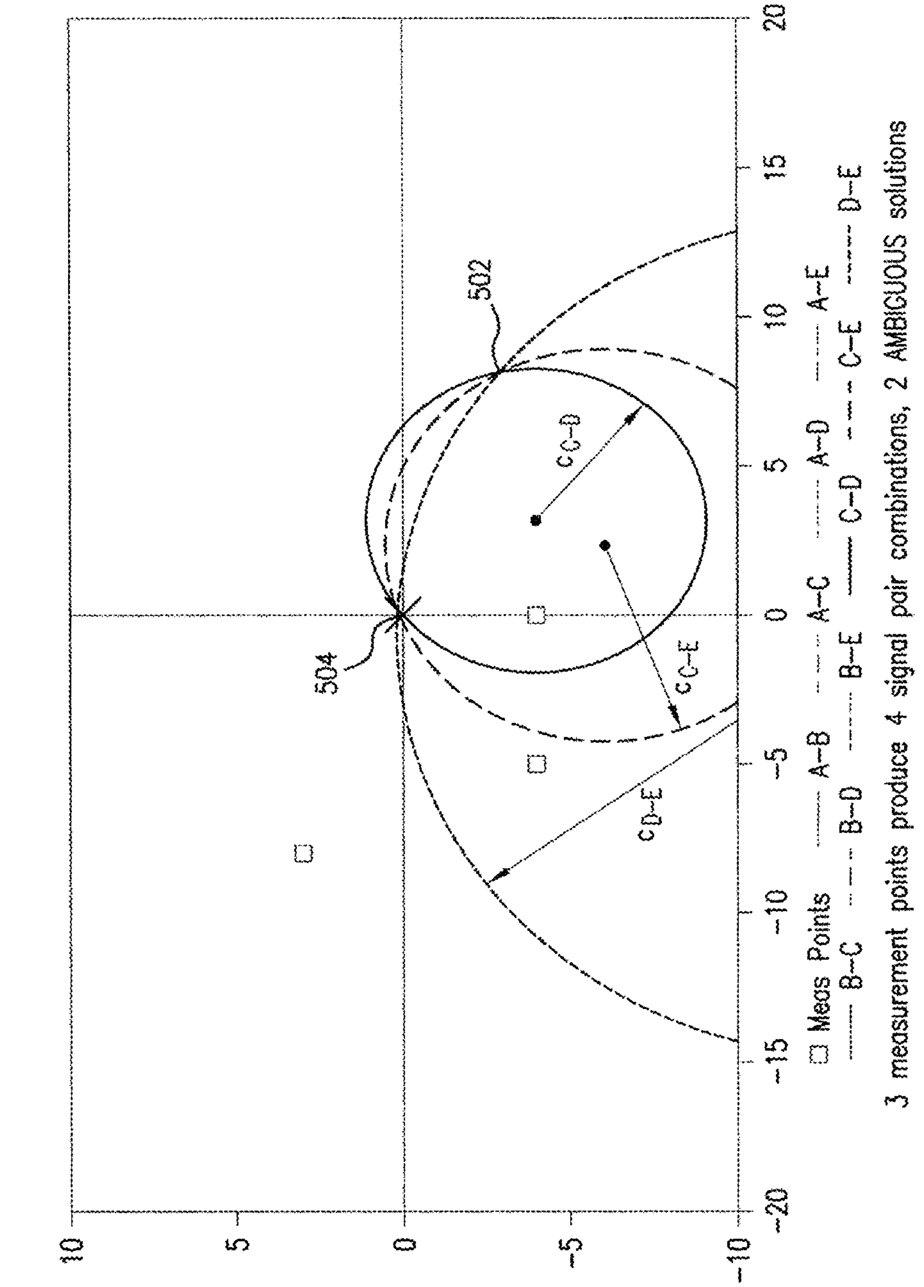
FIG. 5 is a graph illustrating several possible locations for the emitter provided by measurements from three points, two of which are taken on a straight line path.

FIG. 5 shows a graphical solution where signal power measurements are taken at three distinct locations, C, D, and E, but with one of the measurement locations deviated from the straight line. Even one deviation greatly improves the predictability of the system reducing the number of possible ambiguous solutions to two, 502 and 504.

Figure 6:
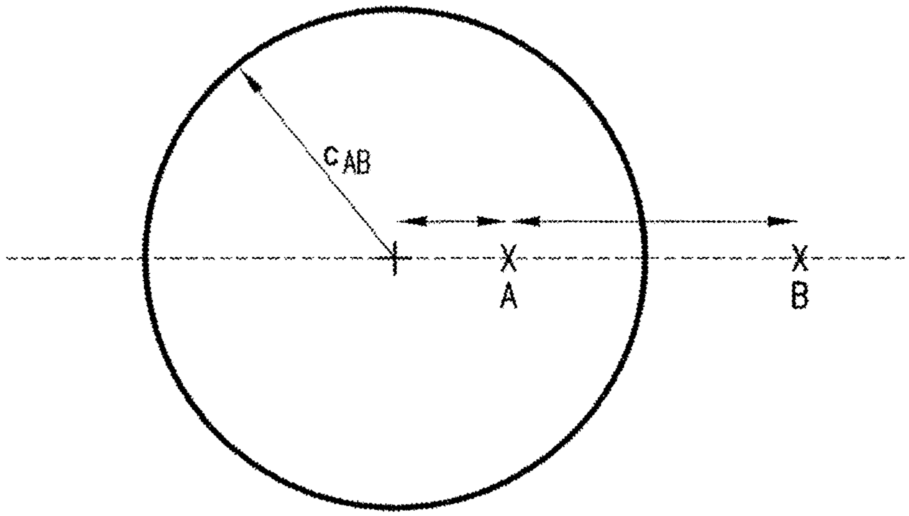
FIG. 6 is a graph illustrating an infinite number of possible locations for the emitter provided by measurements from two points.

FIG. 6 shows an ambiguous graphical solution where signal power measurements are taken at two distinct locations, A and B. The graph shows one signal pair combination with one circle and an infinite number of possible solutions. Because the emitter is equally likely to be at any of the infinite number of possible locations, it is impossible to pinpoint the location of emitter 102 with two or fewer measurement points. However, this precise locus can still provide useful emitter 102 location information, because portions of the locus can often be eliminated by other knowledge of terrain, geographic features, or a priori knowledge of the emitter behavior and/or probable location.

Noise and deviations from the constant free-space path loss exponent can lead to measurement errors, which results in circles that do not all intersect at a single point. The correct location can be estimated by grouping all of the like intersection points together and summing the total number of intersections in each grouping, and then plotting the distribution of like solutions in a histogram. FIGS. 7A-7E show histograms of the intersection groupings with an increasing amount of random measurement error. The amount of measurement error is represented in decibels (dB), where 1 dB is approximately 20% random measurement error and 2 dB is approximately 40% random measurement error.

Figure 7A:
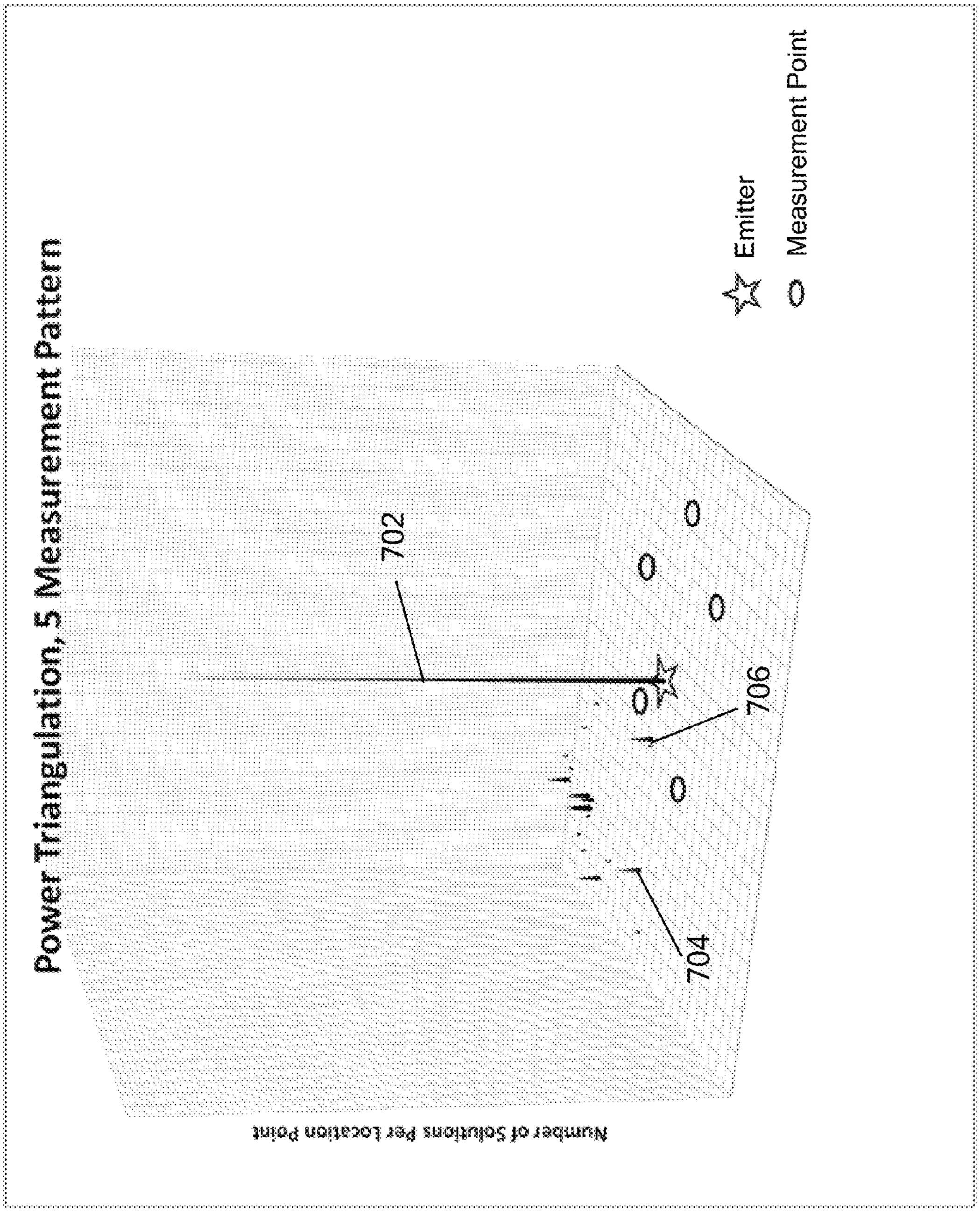
FIG. 7A is a histogram of the intersection groupings for the location of the emitter with 0 dB random measurement error.

FIG. 7A demonstrates the accuracy of the location estimate with 0 dB random measurement error, i.e. a basis model. FIGS. 7B-7E represent the location estimate with an increasing amount of measurement error. FIGS. 7B-7E are derived by increasing the proportion of a fixed random error data set that is injected into the basis model, shown in FIG. 7A. This keeps the ratio of the error injected among measurement points constant, but not the error itself. In the field, random measurement error cannot be controlled in such a precise manner, however, keeping the ratio of the injected error constant is useful to show the slowly creeping effects of increasing error.

FIG. 7A demonstrates the accuracy of the location estimate with 0 dB random measurement error. By far, the greatest number of solutions lies at location 702, which means it has the highest probability with respect to location 702 of being the correct location of emitter 102. Several incorrect solutions are identified, e.g. at points 704 and 706; however, these solutions have a low probability as compared to location 702 of being correct.

Figure 7B:
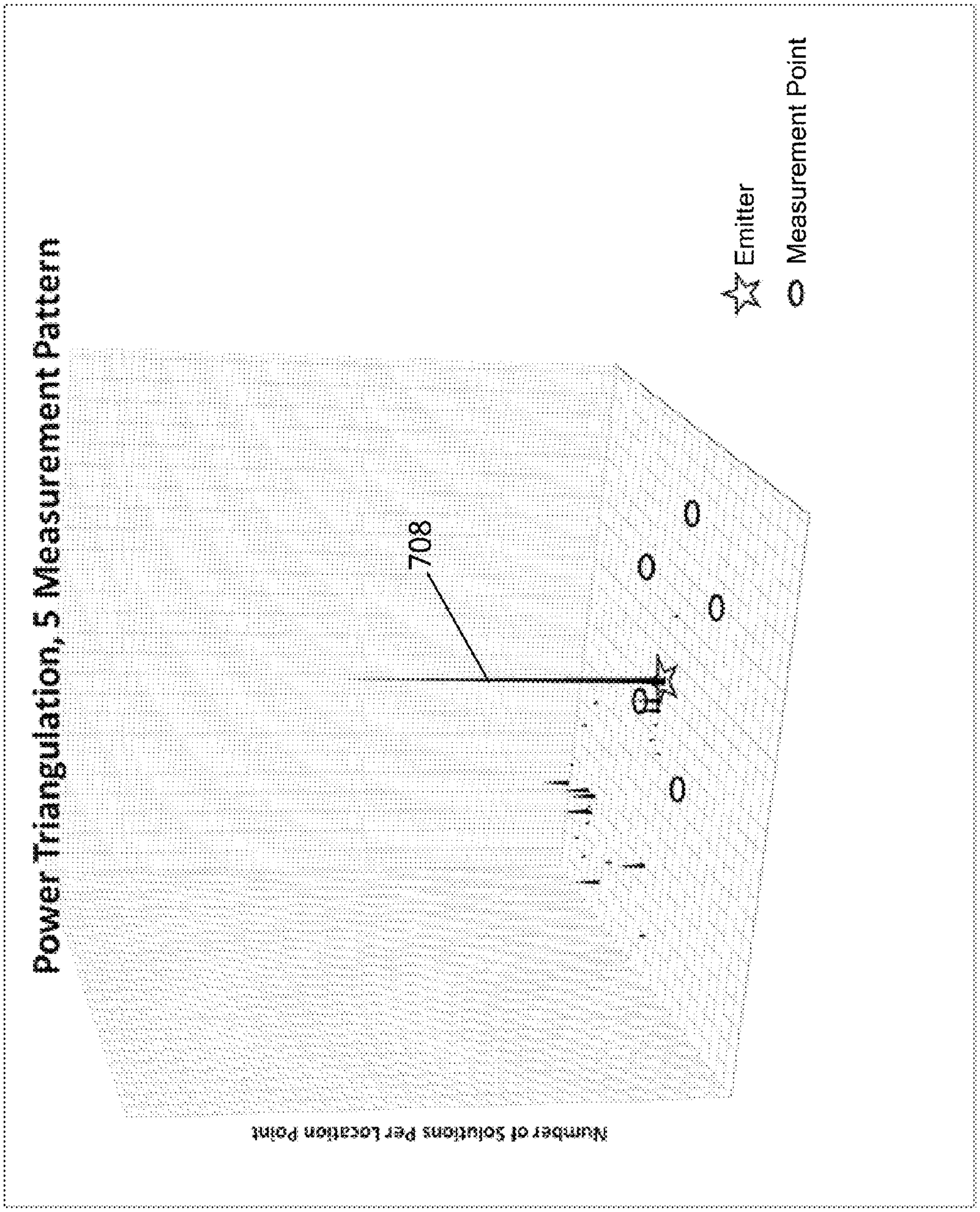
FIG. 7B is a histogram of the intersection groupings for the location of the emitter with 0.2 dB random measurement error.
Figure 7C:
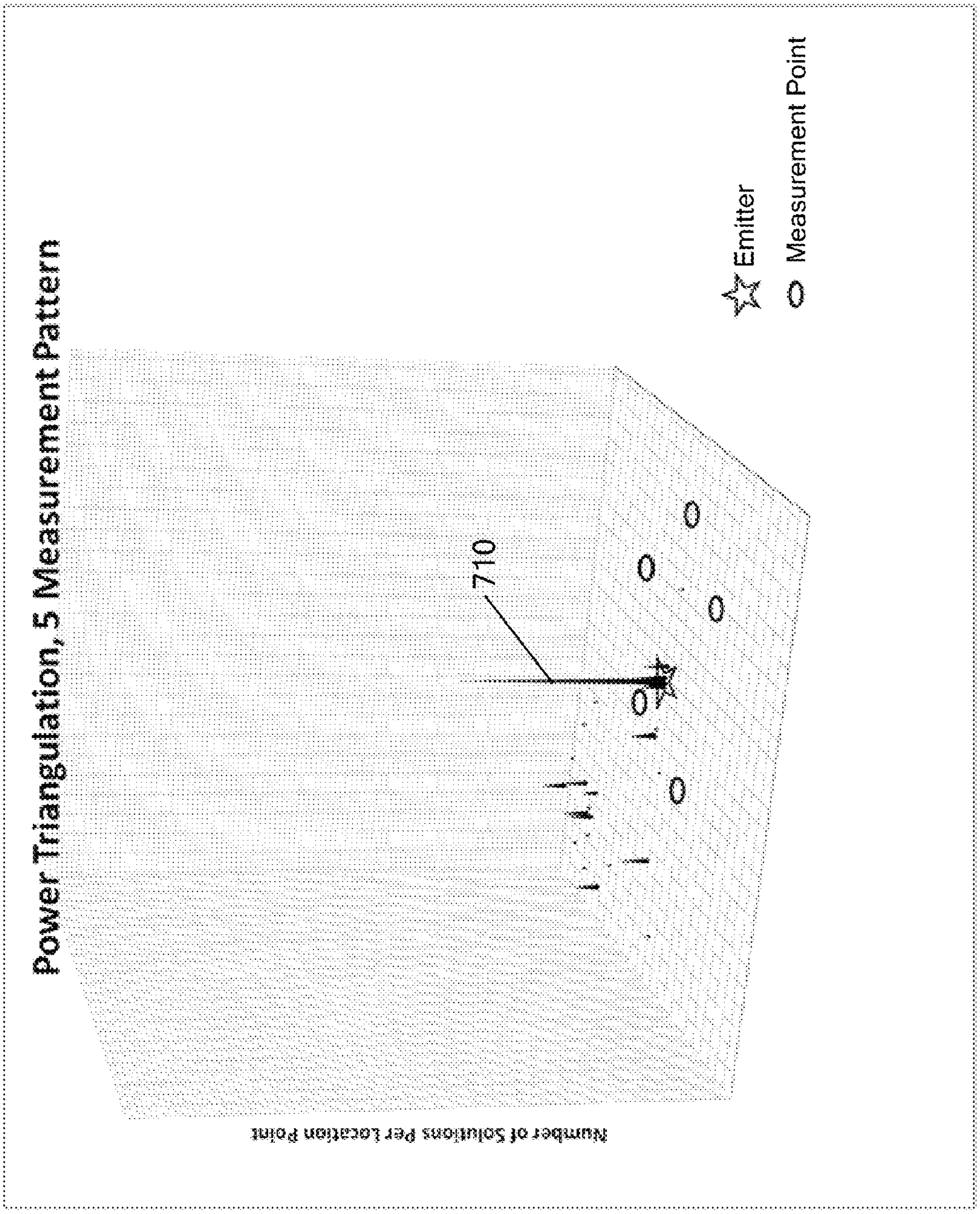
FIG. 7C is a histogram of the intersection groupings for the location of the emitter with 0.5 dB random measurement error.
Figure 7D:
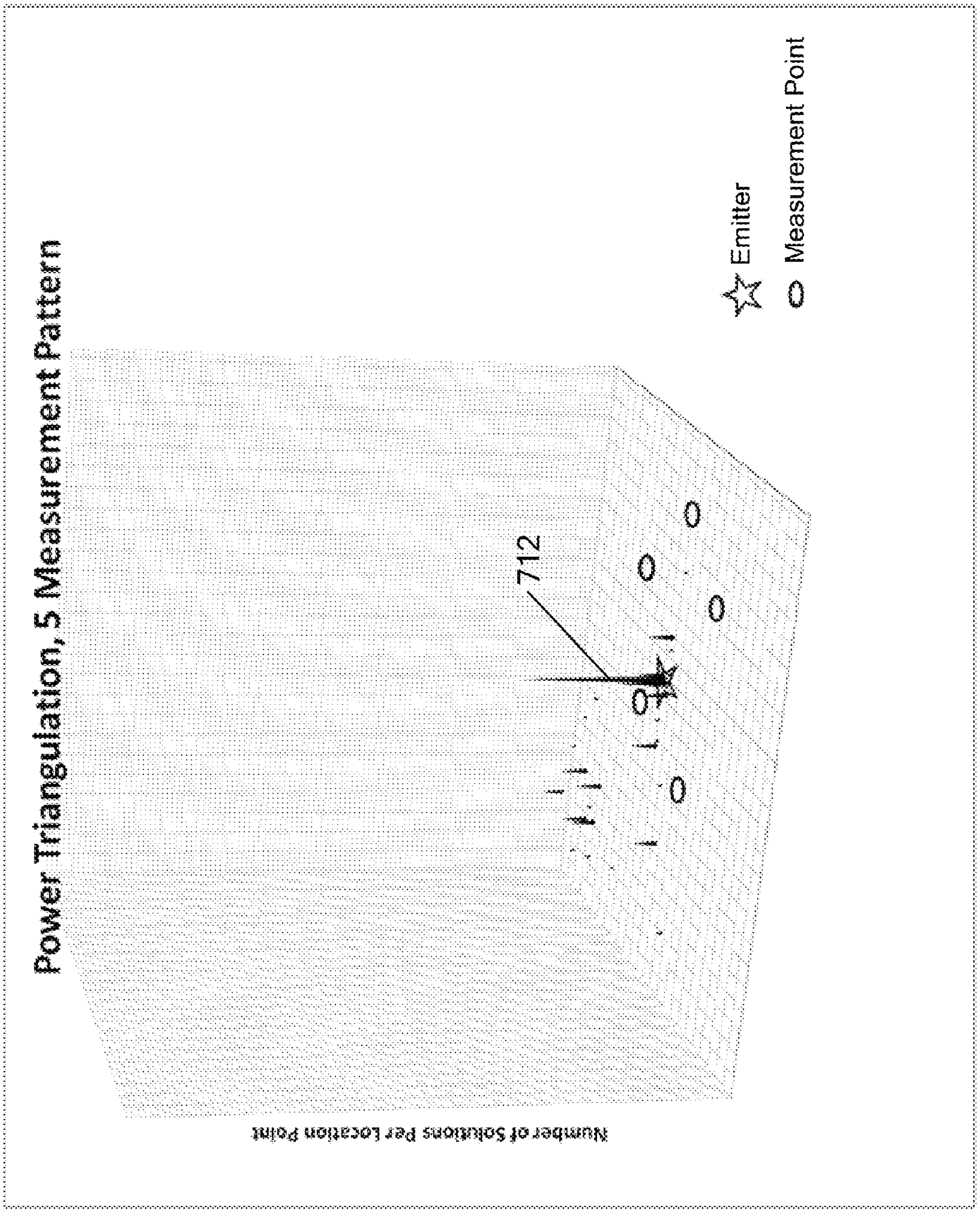
FIG. 7D is a histogram of the intersection groupings for the location of the emitter with 1.0 dB random measurement error.
Figure 7E:
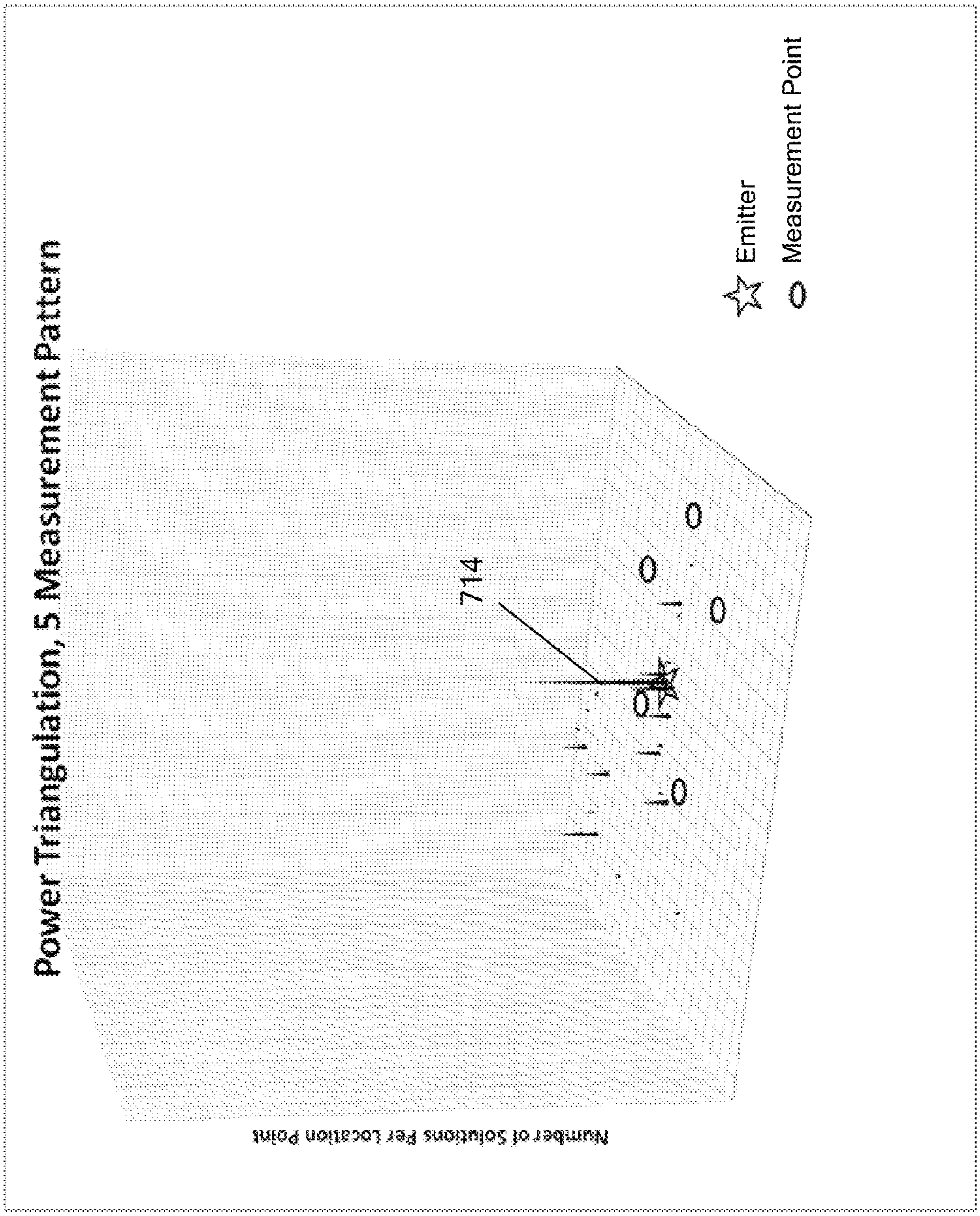
FIG. 7E is a histogram of the intersection groupings for the location of the emitter with 2.0 dB random measurement error.

FIGS. 7B-7D demonstrate the accuracy of the location with increasing amount of random measurement error. FIG. 7B shows a histogram of the intersecting groupings with a 0.2 dB random measurement error. FIG. 7C shows a histogram of the intersecting groupings with a 0.5 dB random measurement error. FIG. 7D shows a histogram of the intersecting groupings with a 1.0 dB random measurement error. FIG. 7E shows a histogram of the intersecting groupings with a 2.0 dB random measurement error. In each histogram, the number of solutions at the correct location 708, 710, 712, and 714, FIGS. 7B, 7C, 7D, and 7E respectively, decreases; however, the "correct" location has substantially more solutions than the other locations. In that regard, the solution with the highest number of intersecting groupings is most likely the correct solution.

The intersection grouping method, as discussed above, may not yield a clear majority for the number of solutions at a particular location when there is a large amount of random measurement error. The large amount of random measurement error notwithstanding, an accurate location for emitter 102 can be predicted using a data smoothing function. There are many types of data smoothing functions known to those skilled in the art, any one of which can be employed. The illustrative embodiment uses a moving symmetric window. Generally, the moving windowing scheme takes a window of data around a given data point and replaces it with a sum of all of the intersections within the window. The window is moved across all of the data until all or almost all of the data in the data set has been evaluated. The window location with the highest sum is the probable location of emitter 102.

The method as described above is applied in a two-dimensional scenario with receiver 106, antenna 105, and position determining device 110 mounted on vehicle 104. Vehicle 104 is flown in a random search pattern with the power levels of the signal of interest recorded and retrieved from vehicle 104 when it returns to base or transmitted to the base station by a data link from vehicle 104, or the location results can be computed onboard and retrieved or transmitted via downlink to a base station. While a two-dimensional approach is used, in reality it is a three-dimensional problem. This methodology, with an additional application of trigonometry, can be applied to the three-dimensional case as well. Vehicle 104 is positioned at a finite altitude measuring emitter 102 most likely from the ground, i.e. zero altitude. If the altitude is small compared to the distance to the potential target emitters (typically >=5-10:1) then the two-dimensional analysis is a reasonable approximation to a more complex three-dimensional analysis.

Reference has been made to a specific mathematical method for determining the location of the unknown emitter. One skilled in the art will also readily recognize that other mathematical solutions are also contemplated. For example, where signal power measurements are taken at four distinct measurement points A, B, C, D with emitter 102 emitting a signal of interest at a generally constant power level from an unknown location at a point (x, y), the distance from each measurement point A, B, C, D to the emitter is given by:

$$d_1=\sqrt{(x-x_1)^2+(y-y_1)^2}$$

$$d_2=\sqrt{(x-x_2)^2+(y-y_2)^2}$$

$$d_3=\sqrt{(x-x_3)^2+(y-y_3)^2}$$

$$d_4=\sqrt{(x-x_4)^2+(y-y_4)^2}$$

The difference in signal power between the measurement points is related to the constant free-space path loss (α), which equals 2, and the ratio of distances between measurement points and the emitter.

$$P_{12} = P_1 - P_2 = -10\alpha\log_{10}\left(\frac{d_1}{d_2}\right)$$

$$P_{23} = P_2 - P_3 = -10\alpha\log_{10}\left(\frac{d_2}{d_3}\right)$$

$$P_{31} = P_3 - P_1 = -10\alpha\log_{10}\left(\frac{d_3}{d_1}\right)$$

$$P_{14} = P_1 - P_4 = -10\alpha\log_{10}\left(\frac{d_1}{d_4}\right)$$

$$P_{24} = P_2 - P_4 = -10\alpha\log_{10}\left(\frac{d_2}{d_4}\right)$$

$$P_{34} = P_3 - P_4 = -10\alpha\log_{10}\left(\frac{d_3}{d_4}\right)$$

The distance ratios derived from the above equations, are as follows:

$$d_{12} = \left(\frac{d_1}{d_2}\right) = 10^{-\frac{p_1-p_2}{10\alpha}}$$

$$d_{23} = \left(\frac{d_2}{d_3}\right) = 10^{-\frac{p_2-p_3}{10\alpha}}$$

$$d_{31} = \left(\frac{d_3}{d_1}\right) = 10^{-\frac{p_3-p_1}{10\alpha}}$$

$$d_{14} = \left(\frac{d_1}{d_4}\right) = 10^{-\frac{p_1-p_4}{10\alpha}}$$

$$d_{24} = \left(\frac{d_2}{d_4}\right) = 10^{-\frac{p_2-p_4}{10\alpha}}$$

$$d_{34} = \left(\frac{d_3}{d_4}\right) = 10^{-\frac{p_3-p_4}{10\alpha}}$$

Four measurement points A, B, D, E produce six circle equations, each of which has a center point and a radius:

$$c_{12} = \left(\frac{x_c d_{12}^2 - x_1}{d_{12}^2 - 1}\right), \left(\frac{y_2 d_{12}^2 - y_A}{d_{12}^2 - 1}\right);$$

$$r_{12} = \sqrt{\left(\frac{x_1 - x_2 d_{12}^2}{d_{12}^2 - 1}\right)^2 + \left(\frac{y_1 - y_2 d_{12}^2}{d_{12}^2 - 1}\right)^2 - \frac{d_{12}^2 x_2^2 + d_{12}^2 y_2^2 - x_1^2 - y_1^2}{d_{12}^2 - 1}}$$

$$c_{23} = \left(\frac{x_2 d_{23}^2 - x_2}{d_{23}^2 - 1}\right), \left(\frac{y_3 d_{23}^2 - y_2}{d_{23}^2 - 1}\right);$$

$$r_{23} = \sqrt{\left(\frac{x_2 - x_3 d_{23}^2}{d_{23}^2 - 1}\right)^2 + \left(\frac{y_2 - y_3 d_{23}^2}{d_{23}^2 - 1}\right)^2 - \frac{d_{23}^2 x_3^2 + d_{23}^2 y_3^2 - x_2^2 - y_2^2}{d_{23}^2 - 1}}$$

$$c_{31} = \left(\frac{x_1 d_{31}^2 - x_3}{d_{31}^2 - 1}\right), \left(\frac{y_1 d_{31}^2 - y_3}{d_{31}^2 - 1}\right);$$

$$r_{31} = \sqrt{\left(\frac{x_3 - x_1 d_{31}^2}{d_{31}^2 - 1}\right)^2 + \left(\frac{y_3 - y_1 d_{31}^2}{d_{31}^2 - 1}\right)^2 - \frac{d_{31}^2 x_1^2 + d_{31}^2 y_1^2 - x_3^2 - y_3^2}{d_{31}^2 - 1}}$$

$$c_{41} = \left(\frac{x_4 d_{14}^2 - x_1}{d_{14}^2 - 1}\right), \left(\frac{y_4 d_{14}^2 - y_1}{d_{14}^2 - 1}\right);$$

$$r_{14} = \sqrt{\left(\frac{x_1 - x_4 d_{14}^2}{d_{14}^2 - 1}\right)^2 + \left(\frac{y_1 - y_4 d_{14}^2}{d_{14}^2 - 1}\right)^2 - \frac{d_{14}^2 x_4^2 + d_{14}^2 y_4^2 - x_1^2 - y_1^2}{d_{14}^2 - 1}}$$

$$c_{24} = \left(\frac{x_4 d_{24}^2 - x_2}{d_{24}^2 - 1}\right), \left(\frac{y_4 d_{24}^2 - y_2}{d_{24}^2 - 1}\right);$$

$$r_{24} = \sqrt{\left(\frac{x_2 - x_4 d_{24}^2}{d_{24}^2 - 1}\right)^2 + \left(\frac{y_2 - y_4 d_{24}^2}{d_{24}^2 - 1}\right)^2 - \frac{d_{24}^2 x_4^2 + d_{24}^2 y_4^2 - x_2^2 - y_2^2}{d_{24}^2 - 1}}$$

$$c_{34} = \left(\frac{x_4 d_{34}^2 - x_3}{d_{34}^2 - 1}\right), \left(\frac{y_4 d_{34}^2 - y_3}{d_{34}^2 - 1}\right);$$

$$r_{34} = \sqrt{\left(\frac{x_4 - x_4 d_{34}^2}{d_{34}^2 - 1}\right)^2 + \left(\frac{y_4 - y_4 d_{34}^2}{d_{34}^2 - 1}\right)^2 - \frac{d_{34}^2 x_4^2 + d_{34}^2 y_4^2 - x_3^2 - y_3^2}{d_{34}^2 - 1}}$$

The intersection points for all of the measurement-pair loci can be solved as a set of simultaneous equations or represented graphically.

Reference has been made to several components throughout this disclosure as though each component is a unique component. One skilled in the art will readily recognize, however, that the various systems, receivers, and processors can be incorporated into one or more other systems, receivers, and processors thereby reducing the number of components.

Reference may also have been made throughout this disclosure to "one embodiment," "an embodiment," or "embodiments" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

While the present invention has been particularly shown and described with reference to exemplary embodiments thereof, it should be understood by those of ordinary skill in the art that various changes, substitutions and alterations could be made herein without departing from the spirit and scope of the invention as embodied by the appended claims and their equivalents.

What is claimed is:

1. A system for determining a location of an emitter emitting a signal of interest, the system comprising:

a vehicle, including a position determining device to generate a location datum for the vehicle at each of a plurality of measurement points, an antenna to detect the signal of interest, and a receiver in communication with the antenna to receive the signal of interest;

a processor in communication with the position determining device and the receiver; and a program executing on the processor to determine the power level of the signal of interest at all of the plurality of measurement points and to determine a solution for a probable location of the emitter from the change in power level of the signal of interest between every pair of measurement points, and determine the probable location of the emitter according to a location point for the probable location of the emitter having a greatest number of solutions.

2. The system of claim 1, wherein the processor assumes the signal of interest that propagates from the emitter to the antenna passes through a medium having a substantially constant path loss exponent.

3. The system of claim 2, wherein the processor defines the path loss exponent to be two.

4. The system of claim 1, wherein the power level of the signal of interest is measured at at least four measurement points to determine an unambiguous location for the emitter, and wherein the signal of interest propagates from the emitter to each measurement point through a medium having a substantially constant path loss exponent.

5. The system of claim 4, wherein the processor calculates a solution for the location of the emitter by calculating a plurality of equations that correspond with a plurality of circles and determining a point where all of the circles intersect with each other.

6. The system of claim 1, wherein the power level of the signal of interest is measured at at least three measurement points to estimate the location of the emitter, and wherein the signal of interest propagates from the emitter to each measurement point through a medium having a substantially constant path loss exponent.

7. The system of claim 1, wherein the power level of the signal of interest is measured at at least two measurement points to estimate the location of the emitter, and wherein the signal of interest propagates from the emitter to each measurement point through a medium having a substantially constant path loss exponent.

8. The system of claim 1, wherein the program executing on the processor determines the location of the emitter by equating a ratio of the distances between each measurement point and the emitter with a ratio of a change in power level of the signal of interest between each measurement point.

9. The system of claim 8, wherein the processor calculates a solution for the location of the emitter by calculating a plurality of equations that correspond with a plurality of circles and determining at least one point where at least two circles intersect with each other, wherein the intersection represents a possible location of the emitter.

10. The system of claim 9, wherein the location of the emitter is determined by grouping intersections that lie on a same coordinate and summing each grouping.

11. The system of claim 10, wherein the grouping with the most intersections is the location of the emitter.

12. The system of claim 10, wherein the groupings of the intersections are evaluated with a moving window to smooth out random measurement error.

13. The system of claim 1, wherein the vehicle is capable of being positioned at a location where there is a generally constant path loss exponent for the signal of interest as it travels from the emitter to the antenna.

14. The system of claim 1, wherein the signal of interest is one of the following, an electro-magnetic wave and an audio signal.

15. A method for determining a location of an emitter emitting a signal of interest, the method comprising:

receiving a signal of interest at a plurality of measurement points;

determining a power level for the signal of interest at each measurement point;

assuming a substantially constant path loss exponent for the signal of interest; and calculating a probable location of the emitter by equating a ratio of the distances between each measurement point and the emitter with a ratio of a change in power level of the signal of interest between measurement points for every pair of measurement points, and determining the probable location of the emitter according to a location point for the probable location of the emitter having a greatest number of solutions.

16. The method of claim 15, and further comprising determining a distance between each measurement point.

17. The method of claim 15, and further comprising receiving the signal of interest with an antenna positioned on a vehicle.

18. The method of claim 15, and further comprising defining a formula for a circle having a diameter inversely proportional to the ratio of the change in power level of the signal of interest between two measurement points.

19. The method of claim 18, using a priori of knowledge of a geography where the coordinates of the circle lie to exclude coordinates on the circle for the location of the emitter.

20. The method of claim 18, using a priori of knowledge of a behavior of the emitter to exclude coordinates on the circle for the location of the emitter.

21. The method of claim 19, and further comprising receiving the signal of interest at at least three measurement points.

22. The method of claim 21, and further comprising defining a plurality of formulas each of which defining a circle with a diameter inversely proportional to the ratio of the change in power level of the signal of interest between two measurement points.

23. The method of claim 22, determining a location of the emitter by finding at least one intersection point between two circles.

24. The method of claim 23, grouping all the like intersection points together and summing the number of like intersection, wherein in the largest grouping of like intersections is a probable location for the emitter.

25. The method of claim 24, and further comprising receiving the signal of interest at at least four measurement points.

26. The method of claim 25, and further comprising defining a plurality of formulas each of which defining a circle with a diameter inversely proportional to the ratio of the change in power level of the signal of interest between two measurement points.

27. The method of claim 26, and further comprising determining a location of the emitter by finding an intersection point where all of the circles intersect.

28. A system for determining a location of an emitter emitting a signal of interest, the system comprising:

an antenna to detect the signal of interest;

a receiver in communication with the antenna to receive the signal of interest;

a processor in communication with the receiver; and a program executing on the processor to determine the power level of the signal of interest at a plurality of measurement points and to determine a solution for a probable location of the emitter from the change in power level of the signal of interest between every pair of measurement points, and determine the probable location of the emitter according to a location point for the probable location of the emitter having a greatest number of solutions.

29. The system of claim 28, wherein the signal of interest propagates from the emitter to the antenna through a medium having a substantially constant path loss exponent.

30. The system of claim 29, and further comprising a plurality of antennas positioned at each one of the plurality of measurement points to detect the signal of interest.

31. The system of claim 29, and further comprising a vehicle combined to the antenna for moving the antenna between the plurality of measurement points to detect the signal of interest at each of the plurality of measurement points.

32. The system of claim 29, and further comprising a position determining device to generate a location datum for the antenna at each of the plurality of measurement points.

33. The system of claim 29, wherein the medium is free space.

34. The system of claim 29, wherein the power level of the signal of interest is measured at at least four measurement points to determine an unambiguous location for the emitter.

35. The system of claim 34, wherein the processor calculates a solution for the location of the emitter by calculating a plurality of equations that correspond with a plurality of circles and determining a point where all of the circles intersect with each other.

36. The system of claim 29, wherein the power level of the signal of interest is measured at at least three measurement points to estimate the location of the emitter.

37. The system of claim 29, wherein the power level of the signal of interest is measured at at least two measurement points to estimate the location of the emitter.

38. The system of claim 28, wherein the program executing on the processor determines the location of the emitter by equating a ratio of the distances between each measurement point and the emitter with a ratio of a change in power level of the signal of interest between each measurement point.

39. The system of claim 38, wherein the processor calculates a solution for the location of the emitter by calculating a plurality of equations that correspond with a plurality of circles and determining at least one point where at least two circles intersect with each other, wherein the intersection represents a possible location of the emitter.

40. The system of claim 39, wherein the location of the emitter is determined by grouping intersections that lie on a same coordinate and summing each grouping.

41. The system of claim 40, wherein the grouping with the most intersections is the location of the emitter.

42. The system of claim 40, wherein the groupings of the intersections are evaluated with a moving window to smooth out random measurement error.

43. The system of claim 28, wherein the signal of interest is one of the following, an electro-magnetic wave and an audio signal.

* * * * *